United States Patent [19]

Sperduti et al.

[11] Patent Number: 5,332,060
[45] Date of Patent: Jul. 26, 1994

[54] LINEAR ACTUATION MECHANISM FOR ELECTRONICALLY-CONTROLLED TORQUE MODULATED TRANSFER CASE

[75] Inventors: David Sperduti, Auburn; Robert J. Wilson, Warners; Richard E. Eastman, Central Square; Randy W. Adler, Seneca Falls; Sankar K. Mohan, Syracuse, all of N.Y.

[73] Assignee: New Venture Gear, Inc., Troy, Mich.

[21] Appl. No.: 28,956

[22] Filed: Mar. 10, 1993

[51] Int. Cl.[5] .............................................. B60K 17/34
[52] U.S. Cl. ................................... 180/197; 180/247; 180/249
[58] Field of Search ............... 180/233, 247, 248, 249, 180/250, 197

[56] References Cited

U.S. PATENT DOCUMENTS

| | | | |
|---|---|---|---|
| 4,417,641 | 11/1983 | Kageyama | 180/247 |
| 4,484,653 | 11/1984 | Horikoshi et al. | 180/233 |
| 4,711,317 | 12/1987 | Sakakiyama | 180/197 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,887,689 | 12/1989 | Naito | 180/233 |
| 4,895,236 | 1/1990 | Sakakibara et al. | 192/89 |
| 4,989,686 | 2/1991 | Miller et al. | 180/197 |
| 5,033,575 | 7/1991 | Takeshita et al. | 180/249 |
| 5,046,576 | 9/1991 | Miyawaki | 180/223 |
| 5,046,998 | 9/1991 | Frost | 180/247 X |
| 5,152,362 | 10/1992 | Naito | 180/248 |
| 5,199,325 | 4/1993 | Reuter et al. | 180/248 X |

OTHER PUBLICATIONS

SAE Technical Paper Series 892538 (Electronic Transfer Case For 1990 Aerostar Electronic Four Wheel Drive, John Richardson, Ford Motor Company, Wes Dick, Dana Corporation, Nov. 6-9, 1989.

Primary Examiner—Margaret A. Focarino
Assistant Examiner—Victor E. Johnson
Attorney, Agent, or Firm—Harness, Dickey & Pierce

[57] ABSTRACT

The present invention is directed to an improved "on-demand" power transfer system of the type having a transfer mechanism incorporated into the driveline of a four-wheel drive vehicle. The transfer mechanism is arranged to deliver drive torque to the driven wheels so as to establish a two-wheel drive mode of operation. In addition, the transfer mechanism is equipped with a clutch assembly for selectively delivering drive torque to the non-driven wheels for establishing a four-wheel drive mode of operation. The transfer mechanism is further equipped with a linear actuator mechanism for actuating the clutch assembly. The linear actuator mechanism is preferably mounted directly to the transfer mechanism to substantially minimize the packaging requirements associated with the on-demand power transfer system while concomitantly enhancing in-service reliability and allowing pre-assembly of the transfer mechanism prior to final installation into the vehicle driveline. The power transfer system further includes sensors for detecting various dynamic and operational characteristics of the vehicle and generating sensor input signals indicative thereof, and a controller for controlling actuation of the linear actuator means in response to the sensor input signals.

20 Claims, 7 Drawing Sheets

LINEAR ACTUATION MECHANISM FOR ELECTRONICALLY-CONTROLLED TORQUE MODULATED TRANSFER CASE

BACKGROUND OF THE INVENTION

The present invention relates to a power transfer system for controlling the distribution of drive torque between the front and rear wheels of a four-wheel drive vehicle as a function of various system and operator-initiated inputs.

In view of increased consumer popularity in four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. In addition, such part-time transfer cases include a mechanical "mode" shift mechanism which can be selectively actuated by the vehicle operator for rigidly coupling the non-driven wheels to the driven wheels for establishing a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in U.S. Pat. No. 4,773,500 to Naito, et al wherein a hydraulically-actuated clutch assembly is operable for automatically controlling the amount of drive torque transferred to the non-driven wheels as a function the wheel speed difference (i.e., the wheel slip) between the front and rear wheels. While numerous variations of such hydraulically-actuated "on-demand" power transfer systems are known, they are primarily intended for road use and not for off-road recreational use in sport/utility vehicles. Additionally, such "on-demand" systems are rather expensive and complex in that they require a dedicated source of pressurized hydraulic fluid, electronically-controlled flow control valving and the associated hardware and piping.

SUMMARY OF THE INVENTION

Accordingly, the present invention is directed to an improved power transfer system of the type having a transfer mechanism incorporated into the driveline of a four-wheel drive vehicle. The transfer mechanism is arranged to deliver drive torque to the driven wheels so as to establish a two-wheel drive mode of operation. In addition, the transfer mechanism is equipped with a clutch assembly for selectively delivering drive torque to the non-driven wheels for establishing a four-wheel drive mode of operation.

As a related object, the transfer mechanism is further equipped with linear actuator means for actuating the clutch assembly. The linear actuator means is preferably mounted directly to the transfer mechanism to substantially minimize the packaging requirements associated with the power transfer system while concomitantly enhancing in-service reliability and allowing pre-assembly of the transfer mechanism prior to final installation into the vehicle driveline.

In a first preferred form, the power transfer system further includes sensor means for detecting various dynamic and operational characteristics of the vehicle and generating sensor input signals indicative thereof, and controller means for controlling actuation of the linear actuator means in response to the sensor input signals. Under most normal road and tractive conditions, the clutch assembly is maintained in a non-actuated condition such that drive torque is only transmitted to the driven wheels. However, upon the occurrence of traction loss at the driven wheels, the clutch assembly is automatically actuated for transferring drive torque to the non-driven wheels and establish "on-demand" four-wheel drive operation. In addition, the actuated condition of the clutch assembly can be controllably modulated as a function of the sensor input signals for automatically varying the amount of drive torque directed to the non-driven wheels. Thus, the present invention is directed to an "on-demand" power transfer system that is capable of providing instantaneous traction improvement and enhanced steering control upon the occurence of unanticipated traction loss at the driven wheels.

The power transfer system may further include means for establishing a two-wheel drive mode and a part-time four-wheel drive mode in addition to an on-demand drive mode. To this end, mode select means are provided to permit a vehicle operator to select a desired one of the three available drive modes and generate a mode signal indicative thereof. The mode signal is delivered to the controller means for controlling actuation of the linear actuator means. When the two-wheel drive mode is selected, all drive torque is delivered to the driven wheels and the clutch assembly is maintained in the non-actuated condition. When the part-time four-wheel drive mode is selected, the clutch assembly is fully actuated into a "lock-up" condition for distributing the drive torque between the driven and non-driven wheels as dictated by the tractive forces generated at each respective set of wheels. When the "on-demand" mode is selected, the actuated condition of the clutch assembly is controllably modulated as a function of the sensor input signals for automatically varying the amount of drive torque directed to the non-driven wheels. Thus, the power transfer system offers the vehicle operator the option of selecting the specific drive mode best-suited for operating the motor vehicle during normal or adverse road conditions as well as for off-road recreational use.

A further object of the present invention is to supply one or more "operator-initiated" input signals to the controller means for further controlling "on-demand" operation of the power transfer system in response thereto. Preferably, the operator-initiated input signals are indicative of the position of a movable control element (i.e., accelerator pedal, throttle position, steering wheel, brake pedal, etc.) and are used, in conjunction with the sensor input signals, for optimizing the amount of drive torque delivered to the non-driven wheels during operation in the "on-demand" mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

In general, the present invention is directed to a power transfer system which is operably installed between the driven and non-driven wheels of a four-wheel drive vehicle. In operation, the amount of power (i.e., drive torque) transferred to the non-driven wheels is controllably regulated in accordance with various system and driver-initiated inputs for optimizing the tractive characteristics of the vehicle while concomitantly enhancing overall steering control. In addition, the power transfer system may also include means for permitting a vehicle operator to select between a two-wheel drive mode, a part-time four-wheel drive mode, and an "on-demand" drive mode.

Figure 1:
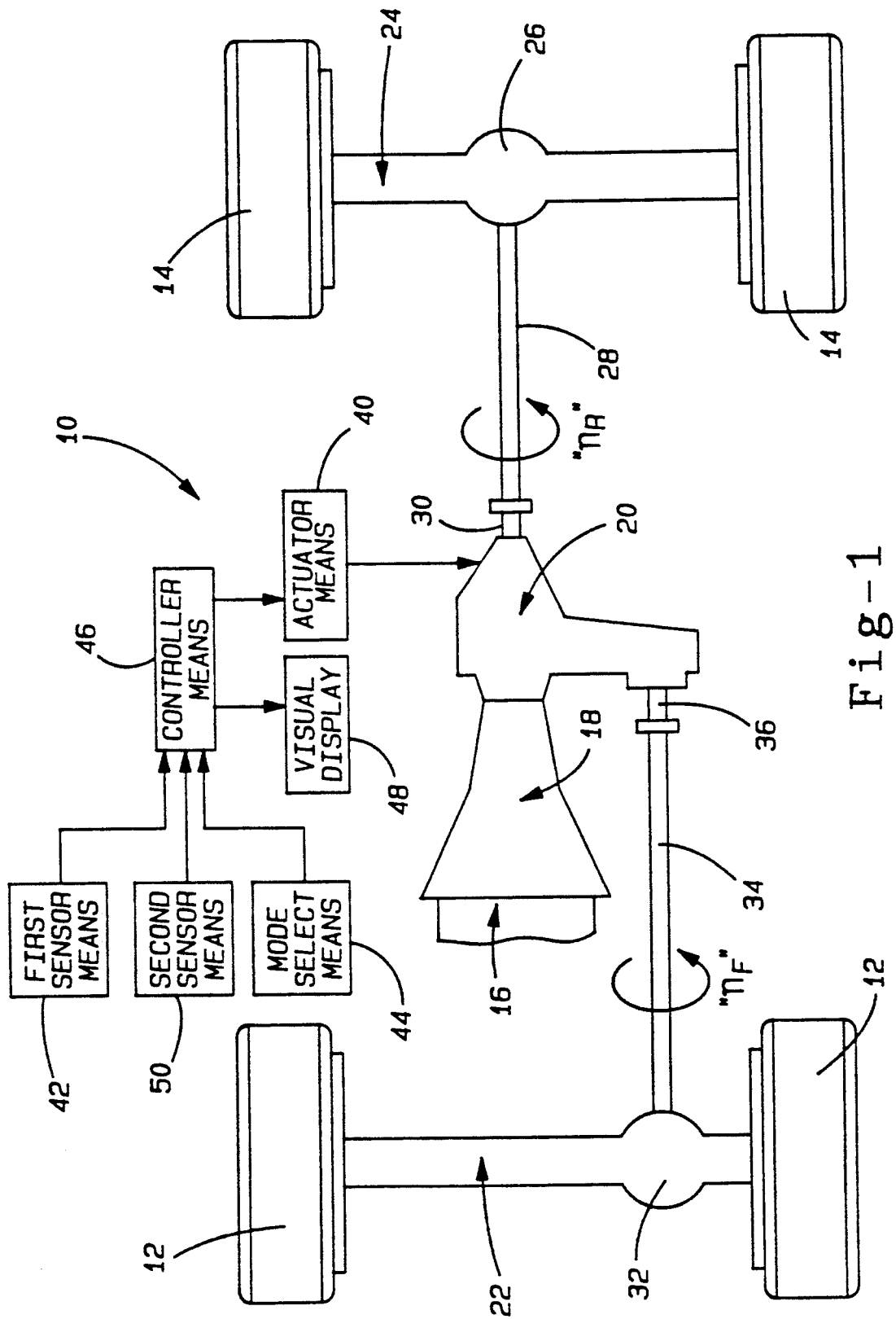
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e, the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a second output member 36 of transfer case 20. It is to be understood that the specific orientation of the drivetrain is merely exemplary in nature and that the drivetrain could be reversed for normally driving front wheels 12.

According to each preferred embodiment of power transfer system 10, transfer case 20 is equipped with an electronically-controlled torque transfer arrangement for delivering drive torque to front wheels 12 (i.e., the non-driven wheels) for establishing a four-wheel drive mode of operation. More specifically, the torque transfer arrangement includes a transfer clutch 38 that is operable for transferring drive torque from first output member 30 to second output member 36, thereby delivering drive torque to front wheels 12. Power transfer system 10 further comprises linear actuator means 40 for actuating transfer clutch 38, first sensor means 42 for sensing specific dynamic and operational characteristics of the motor vehicle and generating sensor input signals indicative thereof, and controller means 46 for generating a control signal in response to the sensor input signals. Moreover, controller means 46 is operable for controlling the amount of drive torque transferred through transfer clutch 38 to second output member 36 by sending the control signal to linear actuator means 40. As is schematically shown, controller means 46 is operable for illuminating a visual display 48, located within the passenger compartment, for providing the vehicle operator with a visual indication of the operational status of power transfer system 10. As an additional feature, linear actuator means 40 may be provided with mode locking means for maintaining power transfer system 10 in the selected drive mode upon the interruption of power.

Power transfer system 10 can additionally include second sensor means 50 for generating "operator-initiated" input signals that are indicative of the position of one or more movable control elements under the control of the vehicle operator. The operator-initiated input signals are used for establishing control characteristics which, in conjunction with the sensor input signals, further regulate the torque distribution during "on-demand" operation. As a further option, power transfer system 10 can be equipped with mode select means 44 for permitting the vehicle operator to select one of a two-wheel drive mode, a part-time four-wheel drive mode and an "on-demand" drive mode. In a system equipped with mode select means 44, linear actuator means 40 is operable for actuating transfer clutch 38 in response to a mode signal generated by the vehicle operator. When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated and maintained in a "lock-up" condition such that second output member 36 is, in effect, rigidly coupled for driven rotation with first output member 30. As such, drive torque is distributed between front and rear wheels 12 and 14, respectively, as dictated by the tractive forces generated at each respective set of wheels. When the "on-demand" drive mode is selected, controller means 46 controls the degree of actuation of linear actuator means 40 for varying the amount of drive torque directed to front wheels 12 through transfer clutch 38 as a function of the sensor input signals for providing improved tractive performance when needed. In addition, the ability to controllably modulate the actuated condition of transfer clutch also provides for superior handling and steering control by substantially minimizing the oversteer and understeer tendencies of the vehicle during a cornering maneuver, such tendencies known to be commonly associated with two-wheel drive operation and part-time four-wheel drive operation, respectively. Other advantages associated with controllably modulating the actuated state of transfer clutch 38 will be detailed hereinafter.

Figure 2:
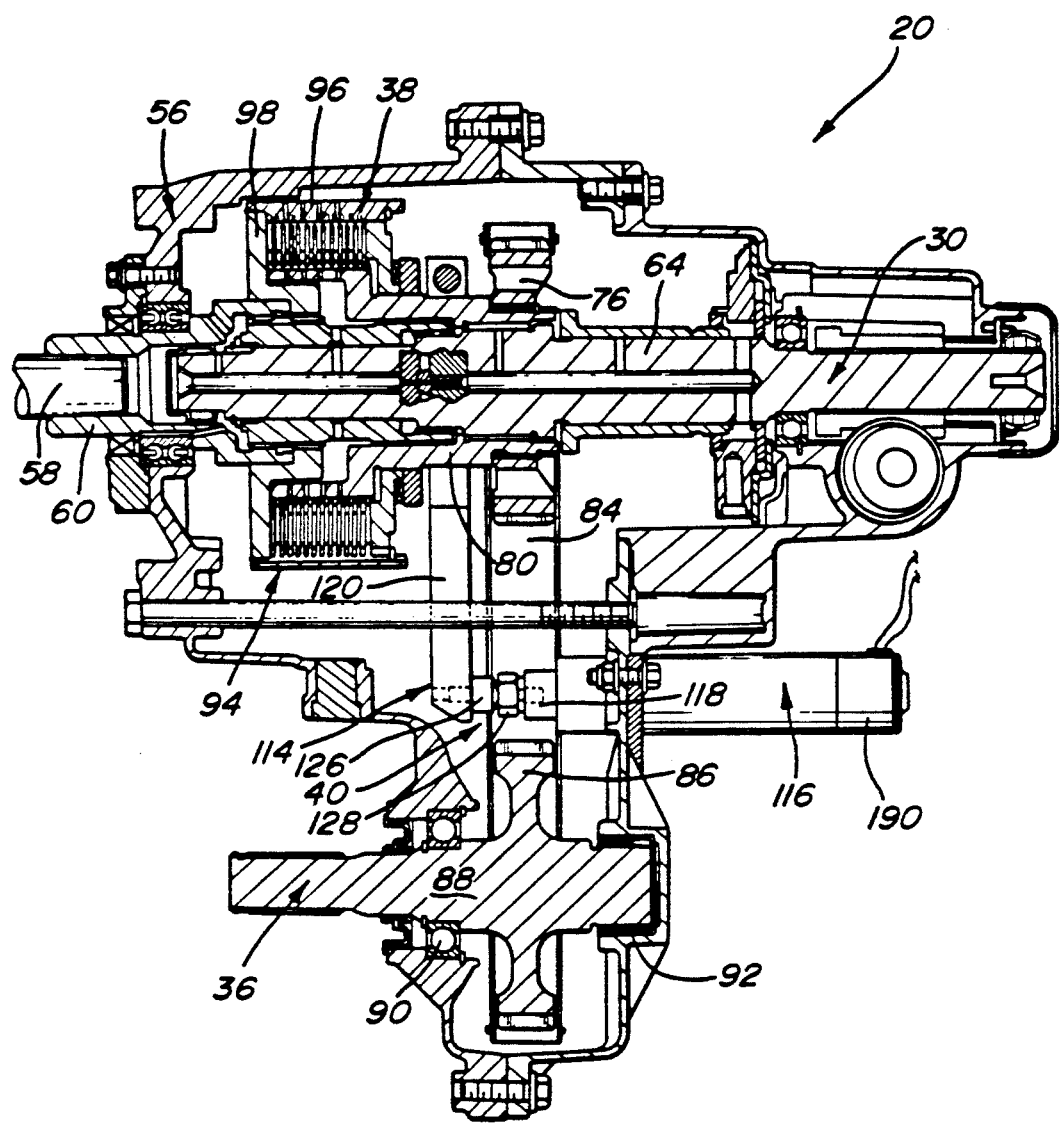
FIG. 2 is a cross-sectional view of a transfer case associated with the power transfer system and which includes a clutch assembly, a drive mechanism, and an electronically-controlled linear actuator.
Figure 3:
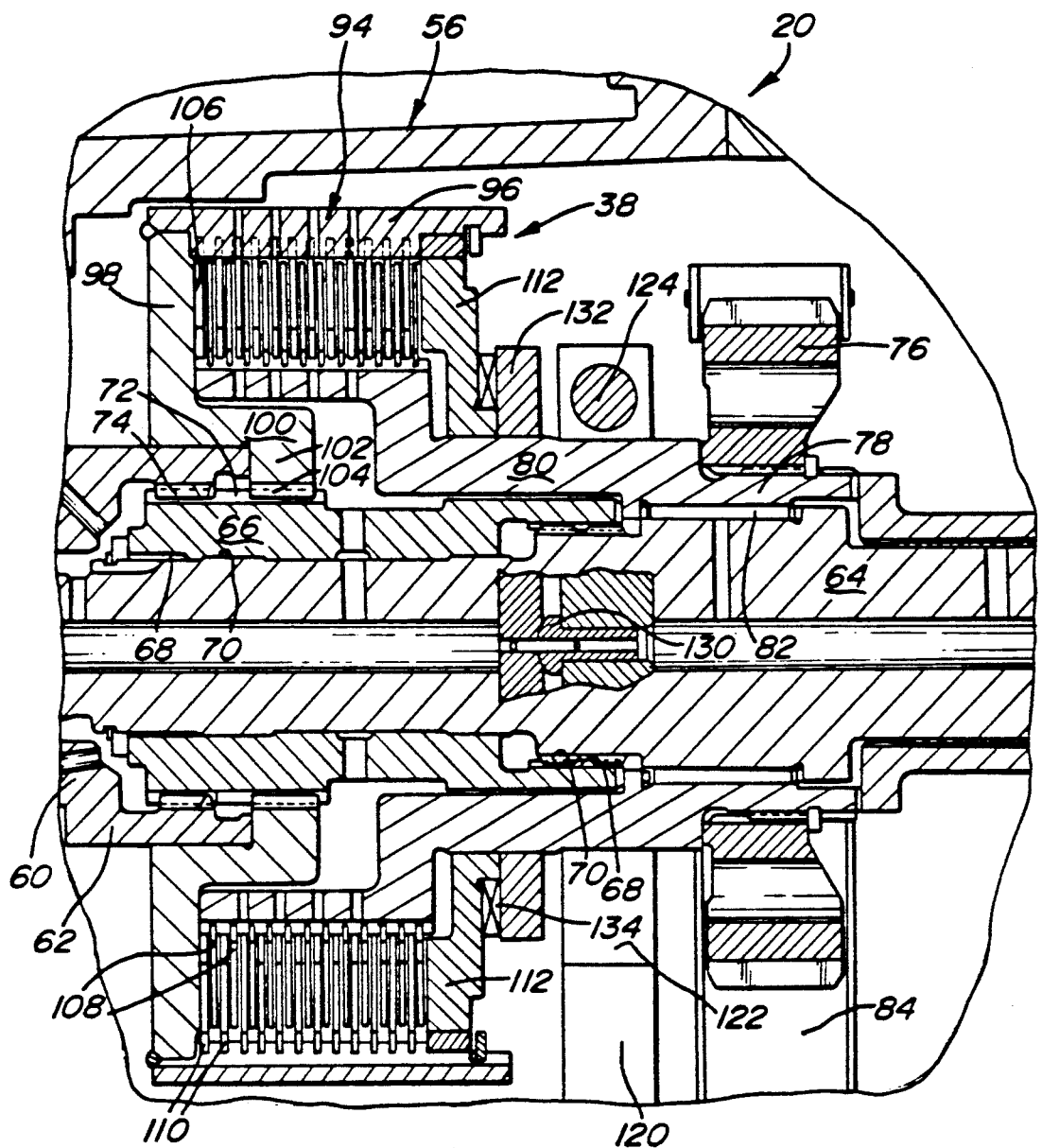
FIG. 3 is an enlarged partial view of FIG. 2 showing the various components in greater detail.

With particular reference to FIGS. 2 and 3, a preferred construction for transfer case 20 will now be described. Transfer case 20 is shown to include a housing 56 formed by a series of modular sections that are suitably interconnected in a conventional manner. A transmission output shaft 58 couples transmission 18 to an input shaft 60 of transfer case 20 for supplying power thereto. Input shaft 60 has an annular input gear 62 formed integral therewith. In the embodiment shown, first output member 30 is an elongated mainshaft 64 which is aligned on the longitudinal axis of input shaft 60 and is supported for rotation within housing 56. An intermediate sleeve 66 is concentrically supported on a forward end portion of mainshaft 64 and is fixed for rotation therewith by means of one or more sets of sleeve internal splines 68 engaged with corresponding sets of external splines 70 formed on mainshaft 64. In addition, intermediate sleeve 66 is formed with external splines 72 that are shown to be engaged with internal splines 74 formed on input gear 62. As such, drive torque is transferred without reduction from input shaft 60 to mainshaft 64 via intermediate sleeve 66. While transfer case 20 is shown to utilize a separate intermediate sleeve 66, it is contemplated that sleeve 66 could be integrated into mainshaft 64 such that mainshaft 64 would be coupled directly to input shaft 60.

With continued reference to FIGS. 2 and 3, means are shown for transferring drive torque from mainshaft 64 to front wheels 12 through transfer clutch 38. More specifically, a drive sprocket 76 is shown fixed (i.e., splined) for rotation on a tubular extension 78 of a rotatable clutch hub 80 that is associated with transfer clutch 38. In addition, extension 78 is rotatably supported on mainshaft 64 by one or more suitable bearing assemblies 82. Drive sprocket 76 drivingly engages a chain 84 which is coupled to a lower driven sprocket 86. Driven sprocket 86 is coupled to, or an integral portion of, second output member 36 of transfer case 20. Second output member 36 is shown as a front output shaft 88 which is supported for rotation within housing 56 by suitable bearing assemblies 90 and 92. As noted, front output shaft 88 is operably connected to the motor vehicle's front wheel 12 via front drive shaft 34.

Transfer clutch 38 is shown operably installed within transfer case 20 for selectively transferring drive torque from intermediate sleeve 66 to front output shaft 88. Preferably, transfer clutch 38 is a mechanically-actuated multi-plate clutch assembly that is arranged to concentrically surround a portion of mainshaft 64 and intermediate sleeve 66. As noted, clutch hub 80 is fixedly secured to drive sprocket 76 so as to drive, or be driven by, front output shaft 88 of transfer case 20. In a preferred form, transfer clutch 38 also includes a rotatable drum assembly 94 concentrically surrounds clutch hub 80 and is fixed (i.e., splined) to intermediate shaft 66 for rotation therewith. Drum assembly 94 has an outer cylindrical drum 96 which is enclosed at one end by a cover plate 98. As seen, cover plate 98 has a cup-shaped annular portion 100 surrounding the aft end of input gear 62 and which forms an inward radial flange 102 having internal splines 104 meshed with external splines 72 of intermediate sleeve 66. Accordingly, drum assembly 94 is coupled for rotation with intermediate sleeve 66 and mainshaft 64. Thus, drum assembly 94 and clutch hub 80 are capable of rotating relative to one another and form an internal chamber 106 therebetween. Disposed within internal chamber 106 are two sets of alternately interleaved friction clutch plates that are operable for transferring torque from input shaft 60 through intermediate sleeve 66 and drum assembly 94 to clutch hub 80 and, ultimately, to front output shaft 88 in response to a clutch "engagement" force applied thereto. One set of clutch plates, referred to as inner clutch plates 108, are mounted (i.e., splined) for rotation with clutch hub 80 while the second set of clutch plates, referred to as outer clutch plates 110, are mounted (i.e. splined) to outer drum 96 for rotation with drum assembly 94. In addition, a reaction plate 112 is mounted on the aft end of outer drum 96 for enclosing the interleaved clutch plates within chamber 106. Reaction plate 112 is rotatable with drum assembly 94 and yet is axially movable with respect to interleaved friction clutch plates 108 and 110. Thus, reaction plate 112 acts as a pressure plate for compressing the interleaved clutch so as to cause drive torque to be transferred through transfer clutch 38 as a function of the clutch engagement force exerted on reaction plate 112 by linear actuator means 40. In the embodiment shown, reaction plate 112 is supported for limited axial movement around the outer peripheral surface of an intermediate portion of clutch hub 80.

To provide means for selectively controlling the amount of torque transfer through transfer clutch 38, linear actuator means 40 is associated with a mechanical drive mechanism 114 and includes an electrically-controlled linear actuator 116. In general, linear actuator 116 is operable for generating an axially-directed output force, the value of which varies as a function of the magnitude of the electrical control signal applied thereto by controller means 46. More specifically, a linearly movable output member 118 of linear actuator 116 acts on drive mechanism 114 for exerting the clutch "engagement" force on reaction plate 112 of transfer clutch 38. Drive mechanism 114 is shown as a lever arm assembly having an elongated lever arm 120. Lever member 120 includes a generally Y-shaped or forked section 122 which is bifurcated to surround mainshaft 64 and the intermediate portion of clutch hub 80. The bifurcated ends of forked section 122 are retained for pivotal movement on a transverse rail 124, the ends of which are retained in suitable sockets (not shown) formed in housing 56. The opposite end of lever arm 120 has a crowned button 126 retained thereon which is acted upon by a ram 128 secured to the free end of output member 118 of linear actuator 116. In general, pivotable movement of lever member 120 about rail 124 is caused in response to linear movement of output member 118 for controlling the clutch engagement force exerted on reaction plate 112 of transfer clutch 38. In addition, a plurality of circumferentially-spaced buttons 130 are secured to a front surface of forked section 122 and are adapted to apply the clutch engagement force to reaction plate 112 for compressing interleaved clutch plates 108 and 110 via a suitable thrust mechanism. Preferably, the thrust mechanism includes an annular apply plate 132 that is journally supported on clutch hub 80 and positioned intermediate reaction plate 112 and lever member 120, and a thrust bearing/washer arrangement 134 interposed between apply plate 132 and reaction plate 112 for allowing rotation of reaction plate 112 with respect to apply plate 132.

From FIGS. 2 and 3, output member 118 is shown in a "retracted" position with lever arm 120 pivoted to a two-wheel drive (2WD) position. In this position, transfer clutch 38 is considered to be in a "non-actuated" condition such that any clutch engagement force being exerted on apply plate 132 is insufficient to cause the transfer of drive torque to clutch hub 80, whereby drive torque is only delivered through mainshaft 64 to rear wheels 14. However, as lever arm 120 is caused to pivot about rail 124 in a first direction (i.e., clockwise) from the two-wheel drive (2WD) position in response to forward (i.e., extension) movement of output member 118 from the "retracted" position, the magnitude of the clutch engagement force exerted on apply plate 132 increases. As such, drive torque is transferred from intermediate sleeve 66 through drum assembly 94 and the interleaved clutch plates to clutch hub 80 and, in turn, to front output shaft 88. Preferably, upon axial movement of output member 118 to a predetermined fully "extended" position, lever arm 120 is pivoted to a four-wheel drive (4WD) position, whereby lever arm 120 exerts the maximum clutch engagement force on apply plate 132 such that transfer clutch 38 is considered to be operating in a fully "actuated" condition. In this fully actuated condition, transfer clutch 38 is completely "locked-up" for effectively coupling mainshaft 64 and front output shaft 88. As will be appreciated, opposite axial movement of output member 118 from the "extended" position toward the "retracted" position results in lever arm 120 pivoting in the opposite direction (i.e., counterclockwise) for proportionally decreasing the clutch engagement force exerted on apply plate 132 of transfer clutch 38 until transfer case 20 is returned to the two-wheel drive mode.

According to the embodiment disclosed, linear actuator 116 is actuated in accordance with specific predefined relationships established in response to the current value of the sensor input signals for moving output member 118 to any axial position between the "retracted" and "extended" positions. Thus, the amount of torque transferred "on-demand" to front output shaft 88 through transfer clutch 38 is proportional to the clutch engagement force, the value of which is determined by the particular position of lever arm 120 between the two-wheel drive (2WD) position and the four-wheel drive (4WD) position that is established upon controlled linear movement of output member 118. As such, power transfer system 10 is operable for modulating the amount of drive torque delivered to front output shaft 88 through transfer clutch 38 as a function of various system and operator initiated inputs.

In its most basic sense, power transfer system 10 automatically transfers drive torque "on-demand" to front wheels 12 during occurrences of slippage of rear wheel 14 that are typically associated with low tractive road conditions. In addition, power transfer system 10 also functions to continuously monitor and regulate the "on-demand" operation in a manner that is independent of any deliberate action by the vehicle operator. Accordingly, the modulation range is established between the limits of bi-directional linear movement of output member 118. Moreover, the magnitude of the clutch engagement force generated by lever arm 120 and applied to transfer clutch 38 is proportional to the magnitude (i.e., percentage duty cycle) of the electric control signal applied to linear actuator 116. Thus, the amount of drive torque transferred through transfer clutch 38 to front output shaft 88 is also proportional to the magnitude of the control signal. As such, the distribution ratio of drive torque between front output shaft 88 and mainshaft 64 of transfer case 20 may be selectively varied as a function of changes in the magnitude of the control signal for optimizing the tractive performance characteristics.

Figure 4:
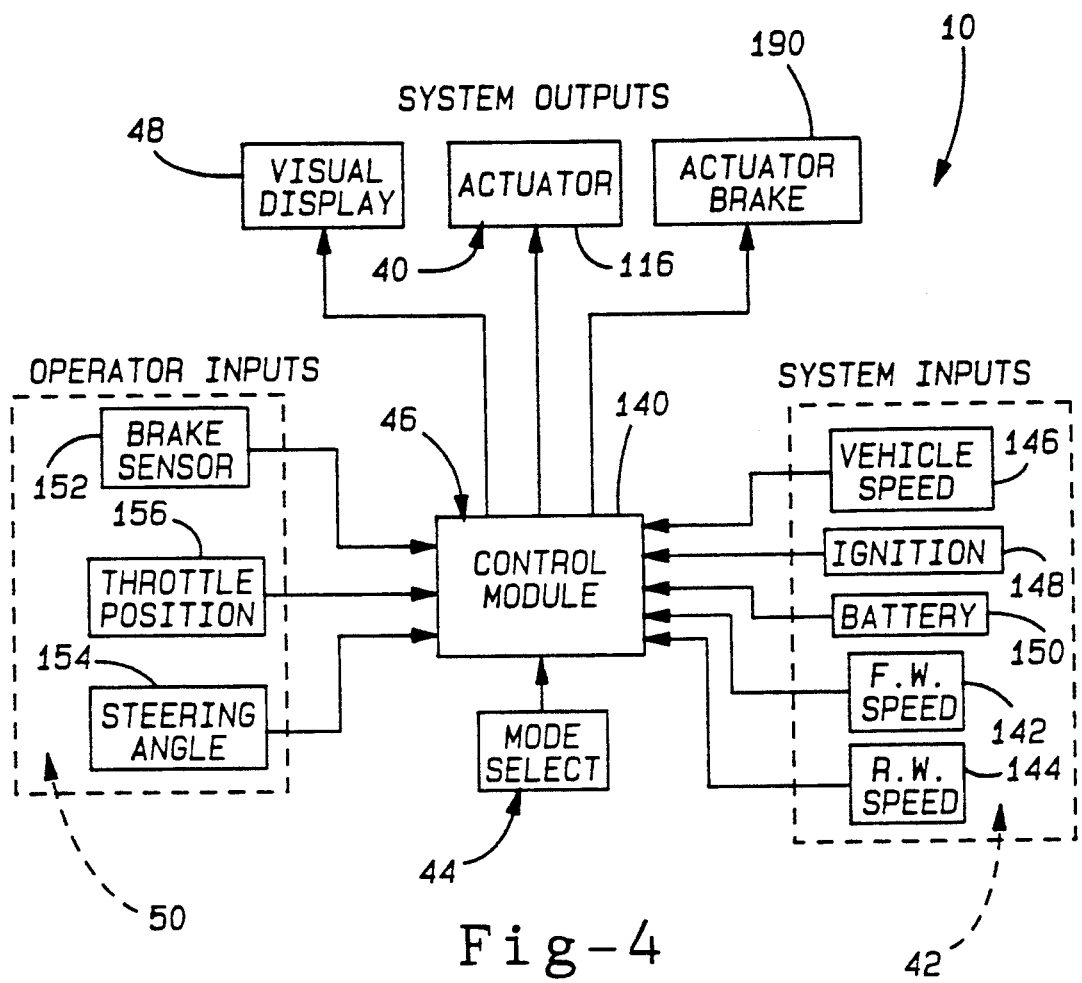
FIG. 4 is a block diagram of the control system for the power transfer system of the present invention.

With particular reference now to FIG. 4, a block diagram of a control system associated with power transfer system 10 is shown. Preferably, controller means 46 is an electronic control module 140 having signal processing and information storage capabilities. In addition, first sensor means 42 is shown as a group of various "system" sensors that are provided for detecting and signaling specific dynamic and operational characteristics of the motor vehicle. The input signals generated by the "systems" sensor group are delivered to electronic control module 140. Preferably, these sensors include a front speed sensor 142 for sensing the rotational speed ($n_F$) of front drive shaft 34, a rear speed sensor 144 for sensing the rotational speed ($n_R$) of rear drive shaft 28, a vehicle speed sensor 146 for sensing a vehicle speed (V), an ignition switch 148 for signalling the operational status of the vehicle, and a battery input 150 for powering electronic control module 140. In vehicles equipped with an anti-lock brake system (ABS), the original equipment ABS sensors provided at each wheel can be used for determining an "average" front drive shaft speed and rear drive shaft speed. Alternatively, front and rear speed sensors 142 and 144, respectively, can be arranged for directly measuring the speed of front output shaft 88 and mainshaft 64, respectively. Moreover, it is possible for vehicle speed sensor 146 to be eliminated with the vehicle speed signal (V) being computed from the front rotational speed signal ($n_F$) generated by front speed sensor 142. However, it is to be understood that any suitable speed sensing arrangement capable of generating a signal indicative of the rotational speed of a shaft is fairly within the scope of the present invention.

The control system also illustrates the use of various "operator-initiated" inputs, as generally categorized by second sensor means 50. These inputs include a brake sensor 152 for sensing when the vehicle operator is applying the brakes, a steering angle sensor 154 for detecting the magnitude of a steering angle ($\Phi$), and an accelerator sensor for sensing an accelerating condition of the vehicle. Preferably, the accelerator sensor is a throttle position sensor 156 for sensing the degree of opening of a throttle valve associated with engine 16 or for sensing the degree of depression of an accelerator pedal, and is operable to produce a throttle position signal (A). The operator-initiated input signals are delivered to control module 140 where they are used, in conjunction with the system input signals, to further control "on-demand" operation.

Figure 5:
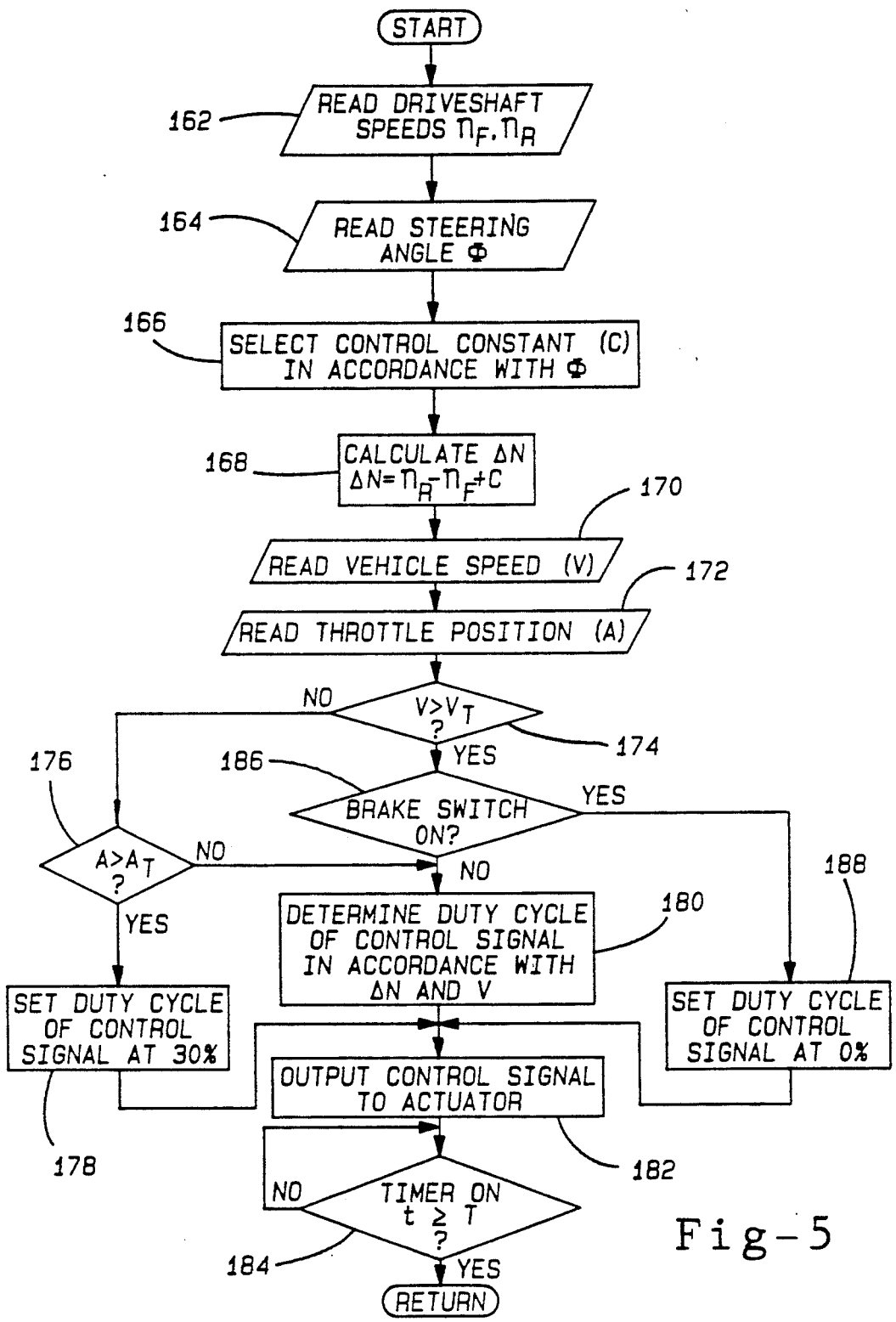
FIGS. 5 is a flow chart depicting a control sequence for the operations performed by the control system of FIG. 4.
Figure 7:
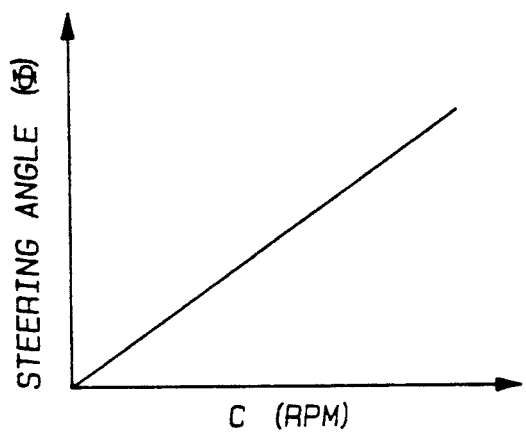
FIG. 7 is an exemplary plot of a relationship between steering angle and a control characteristic used for modifying the speed differential signal.

With reference now to FIG. 5, a control sequence for automatically controlling the "on-demand" operation of power transfer system 10 is shown. In general, the flow chart represents a sequence of the operations performed by electronic control module 140 and which are diagrammatically shown in block form. More specifically, the flow chart illustrates a succession of control steps that are continuously repeated for selecting the value of the electrical control signal to be applied to linear actuator 116 in accordance with predefined relationships between the current value of a front and rear wheel speed differential ($\Delta N$) and vehicle speed (V), as modified by the steering angle ($\Phi$) and other operator-initiated inputs. Block 162 is representative of the control step in which the current value of the rotational speed of front drive shaft 34 ($n_F$) and rear drive shaft 28 ($n_R$) are read. Block 164 indicates the step of reading the value of steering angle ($\Phi$) as detected by steering angle sensor 154. Block 166 represents the operation of selecting a control characteristic (C) in accordance with the steering angle ($\Phi$). FIG. 7 illustrates a plot of an exemplary relationship, which may be stored as a look-up table or computed from an arithmetic equation in control module 140, which correlates the control characteristic (C) as a linear function of the detected steering angle ($\Phi$). Next, block 168 represents the step of calculating a speed differential ($\Delta N$) according to the equation $$\Delta N = n_R - n_F + C$$

Blocks 170 and 172 indicate the steps of reading the current value of the vehicle speed (V) as detected by vehicle speed sensor 146 and the throttle position (A) as detected by throttle position sensor 156. As shown in block 174, control module 140 determines whether the vehicle speed (V) exceeds a predefined threshold value ($V_T$) such as, for example, 5 mph. If the vehicle speed is less than the threshold value ($V_T$), a second determination is made (block 176) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 178. In this manner, power transfer system 10 is adapted to transfer torque to front wheels 12 in response to acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential signal ($\Delta N$) and vehicle speed (V), as indicated by block 180. Block 182 represents the step of outputting the electrical control signal to linear actuator 116 for developing the desired amount of torque transfer, if any, across transfer clutch 38. As shown in block 184, a timer circuit within control module 140 is actuated simultaneously with energization of linear actuator 116 for maintaining such energization for a predetermined time period (T). Once the period of energization (t) equals the predetermined time period (T) (or $t \geq T$), control module 140 repeats the control routine.

To enhance steering control, block 186 is indicative of the control step between steps 174 and 180 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 152) during an occurrence of a low traction road condition and the vehicle speed (V) is greater than the predefined threshold ($V_T$), then control module 140 sets the magnitude of the control signal sent to linear actuator 116 to zero (block 188) for de-actuating transfer clutch 38 and disabling the "on-demand" feature. This control sequence prevents simultaneous braking and "on-demand" four-wheel operation for providing the vehicle operator with greater steering and braking control. However, during the occurrence of a low traction condition when brake sensor 152 signals control module 140 that the vehicle operator is not applying the brakes, electronic control module 140 automatically energizes linear actuator 116 (block 182) for actuating transfer clutch 38 in accordance with the relationships generally denoted by block 180.

Figure 6:
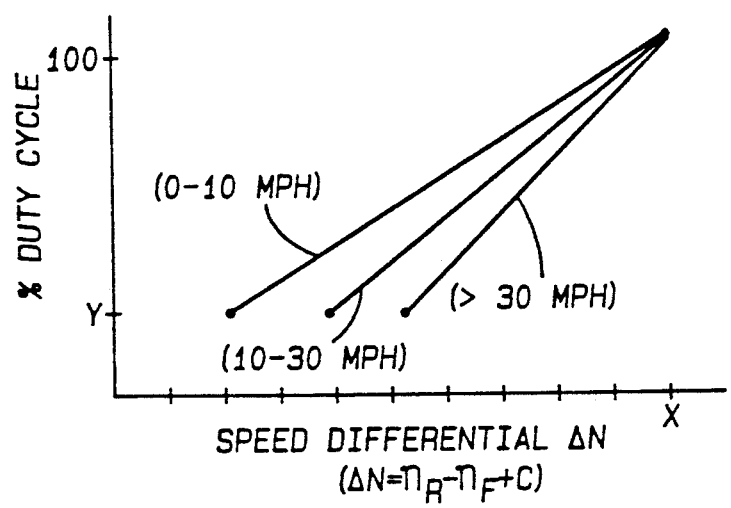
FIG. 6 illustrates exemplary plots of relationships between wheel speed differential signals at various vehicle speed ranges and the electrical control signal supplied by the control system to the linear actuator for controlling the amount of torque transferred through the clutch assembly.

With particular reference to FIG. 6, a set of exemplary plots between the magnitude of the control signal sent to linear actuator 116 and the speed differential ($\Delta N$) will now be detailed. As seen, power transfer system 10 linearly correlates the percentage duty cycle of the electric control signal applied to linear actuator 116 to a range of speed differential ($\Delta N$) values. In general, the percentage duty cycle for the control signal increases linearly from a minimum actuation value (Y %) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 38 to front output shaft 88. However, when the value of the speed differential ($\Delta N$) exceeds the minimum differential limit, "on-demand" four-wheel drive operation is established by supplying a control signal to actuator 116 having a duty cycle value greater than (Y %). Thus, the minimum actuation duty cycle (Y %) for the control signal correlates to the point at which frictional engagement is desired between interleaved clutch plates 108 and 110. In this manner, such frictional engagement results in the delivery of a portion of the total drive torque to front output shaft 88 of transfer case 20 so as to establish initiation of "on-demand" four-wheel drive operation.

Figure 8:
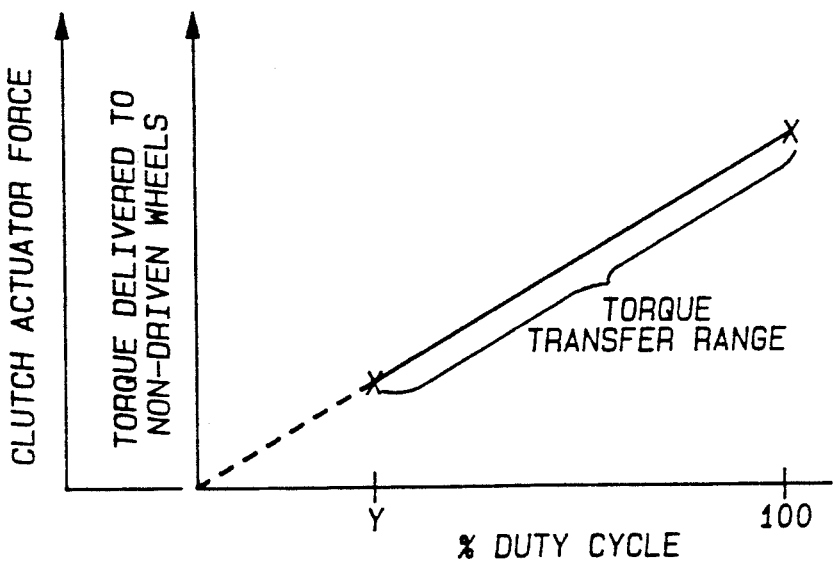
FIG. 8 graphically illustrates the relationship of the electrical control signal with respect to the output force generated by the drive mechanism and the corresponding drive torque transferred through the clutch assembly to the non-driven wheels.

The portion of the total drive torque transferred through transfer clutch 38 to front output shaft 88 increases substantially linearly as the magnitude of the duty cycle for the control signal increases from the minimum actuation value (Y %) to the maximum actuation value (100%). Preferably, the maximum value (X) of the speed differential (ΔN) correlates to the maximum actuation duty cycle (100%) at which point the maximum clutch engagement force is generated for completely locking-up clutch plates 108 and 110. During "on-demand" four-wheel drive operation, a reduction in the magnitude of the control signal sent to linear actuator 116 will result in actuator output member 118 being forcibly retracted (i.e., back-driven) due to the clutch engagement load exerted thereon by lever arm 120. As such, a zero control signal will back-drive output member 118 until lever arm 120 is in the two-wheel drive (2WD) position. Alternatively, the direction of linear movement of actuator output member 118 may be reversed until the desired clutch engagement force is established. As best seen from FIG. 8, an exemplary linear relationship between the magnitude of the duty cycle supplied to linear actuator 116 and the clutch engagement force generated and, in turn, the amount of torque delivered across transfer clutch 38 is shown.

In accordance with an alternative embodiment of the present invention, power transfer system 10 is also equipped with mode select means 44 for establishing at least three distinct operational modes, namely a two-wheel drive mode, a part-time four-wheel drive mode, and an "on-demand" drive mode. In operation the vehicle operator selects the desired mode via mode select means 44 which, in turn, signals controller means 46 of the selection. Thereafter, controller means 46 generates an electrical control signal that is applied to linear actuator 116 for controlling the axial position of output member 118. To provide means for the vehicle operator to shift power transfer system 10 into one of the available operational modes, mode select means 44 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select means 44 offers the vehicle operator the option of deliberately choosing between the part-time and on-demand operative drive modes.

Figure 9:
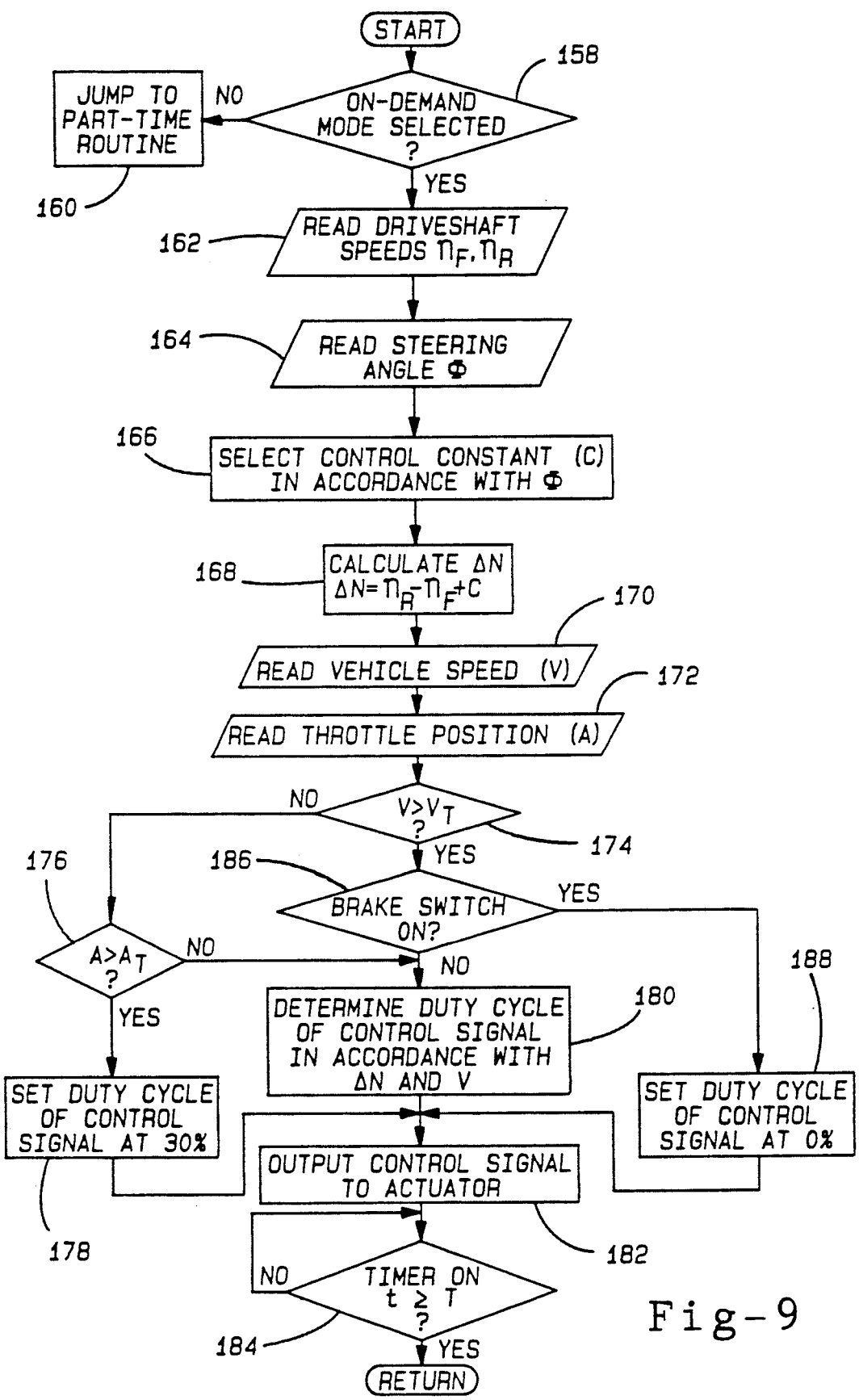
FIG. 9 is a flow chart, similar to that shown in FIG. 5, with the inclusion of additional steps for controlling a power transfer system having mode selection capabilities.

With reference now to FIG. 9, a control sequence for the selection and the subsequent automatic control of the "on-demand" drive mode is shown. In general, the flow chart is identical to that shown in FIG. 5 with the addition of control steps for integrating mode select means 44 into the control system. More particularly, when mode select means 44 signals selection of the "on-demand" mode, as indicated by block 158, a succession of control steps are repeated for selecting the value of the control signal to be applied to linear actuator 116 in accordance with predefined relationships between the current value of a front and rear wheel speed differential (ΔN) and vehicle speed (V), as modified by the steering angle (Φ) and other operator-initiated inputs. The control of operation in the "on-demand" mode is substantially identical to that described with reference to FIGS. 4 through 8. However, if any other mode is selected, then the control sequence jumps to a part-time routine, as indicated by block 160. When the vehicle operator selects an operational mode via mode select means 44 other than the "on-demand" drive mode, control module 140 controls the energized condition of linear actuator 116 for driving output member 118 into one of the "retracted" or "extended" positions which corresponds to the two-wheel drive mode or part-time four-wheel drive mode, respectively. More particularly, if the two-wheel drive mode is selected, control module 140 sends an electrical control signal to linear actuator 116 for linearly moving output member 118 to the "retracted" position for causing lever arm 120 to pivot in the second direction to its (2WD) position. If the part-time four-wheel drive mode is selected, then linear actuator 116 is fully actuated to move output member 118 to the "extended" position for pivoting lever arm 120 in the first direction to its (4WD) position.

The present invention also incorporates means for maintaining the selected mode upon power interruption to actuator 116. To this end, a brake 190, shown in FIGS. 2 and 4, is provided. Brake 190 is an electrically-controlled device that is operable in a "power-off" condition for braking output member 118 of actuator 116. In operation, control module 140 delivers an electrical signal to brake 190 to maintain it in a released or "power-on" condition. During controlled movement of output member 118, brake 190 is maintained in its released "power-on" condition. However, once output member 118 is positioned into one of its retracted or extended positions, power to brake 190 is interrupted for positively retaining lever arm 120 in the desired pivoted position. Thereafter, power to actuator 116 can be interrupted to minimize its on-time service requirements.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a motor vehicle having an engine and first and second sets of wheels, comprising:

a transfer mechanism for transmitting drive torque from the engine to the first set of wheels and selectively transmitting drive torque to the second set of wheels through a transfer clutch capable of varying the torque transmitted therethrough by varying a clutch engagement force;

a drive mechanism including an intermediate member for generating said clutch engagement force;

linear actuator means having a linearly extendable member acting on said intermediate member for producing a linearly directed output force that is exerted thereon to move said intermediate member between a first position for generating a minimum clutch engagement force and a second position for generating a maximum clutch engagement force;

first sensor means for sensing the rotational speed of the first set of wheels and generating a first speed signal indicative thereof;

second sensor means for sensing the rotational speed of the second set of wheels and generating a second speed signal indicative thereof; and control means for receiving said first and second speed signals and generating a speed differential signal that is indicative of a speed differential between the first and second sets of wheels, said control means operable for controlling actuation of said actuator means for varying the torque transmitted through said transfer clutch in response to the position of said drive mechanism lever between said first and second positions in accordance with said speed differential signal.

2. The power transfer system of claim 1 further comprising third sensor means for generating a position signal indicative of a position of a movable control element under the control of a vehicle operator, said position signal being delivered to said control means for use in conjunction with said speed differential signal for modifying the actuated condition of said transfer clutch.

3. The power transfer system of claim 1 wherein said control means generates a control signal that is proportional to said speed differential signal.

4. The power transfer system of claim 3 wherein said linear actuator means comprises an electrically-controlled actuator having a linearly extendable output member acting on said drive mechanism for controlling movement of said drive mechanism in response to the magnitude of said control signal supplied to said actuator.

5. The power transfer system of claim 4 wherein said control means causes said actuator to maintain said drive mechanism in said first position when the value of said speed differential signal is less than a predetermined minimum value, and said drive mechanism being moved to said second position in response to a speed differential signal having a predetermined maximum value.

6. The power transfer system of claim 5 wherein said control means actuates said actuator for increasing the magnitude of drive torque transmitted through said transfer clutch in response to increasing values of said speed differential signal between said predetermined minimum value and said predetermined maximum value.

7. The power transfer system of claim 6 further comprising mode select means for enabling a vehicle operator to select one of a two-wheel drive mode, a part-time four-wheel drive mode, and an on-demand drive mode, `and generate a mode signal indicative of the particular mode selected, said control means controlling actuation of said actuator for shifting said transfer mechanism into said selected one of said drive modes in response to said mode signal, said control means operable for actuating said actuator to move said drive mechanism to said first position when said two-wheel drive mode is selected, for actuating said actuator to move said drive mechanism to said second position when said part-time four-wheel drive mode is selected, and for varying the position of said drive mechanism between said first and second positions as a function of said speed differential signal for automatically varying the amount of drive torque delivered to the second set of wheels when said on-demand drive mode is selected.

8. The power transfer system of claim 7 wherein said mode select means includes a manually-operable device for generating a mode signal that is indicative of the particular drive mode selected by said vehicle operator, said control means being operable to automatically actuate said actuator for moving said drive mechanism from said first position toward said second position when said speed differential exceeds said predetermined minimum value and said mode signal indicates that operation in said on-demand drive mode has been selected.

9. The power transfer system of claim 7 further comprising third sensor means for generating a position signal indicative of a position of a movable control element under the control of a vehicle operator, said position signal being delivered to said control means for use in conjuction with said speed differential signal for modifying the actuated condition of said transfer clutch.

10. The power transfer system of claim 9 wherein said third sensor means includes a brake sensor for providing a brake signal to said control means that indicates when said vehicle operator is applying the brakes, said control means being operable for automatically de-actuating said transfer clutch during on-demand operation in response to application of the brakes.

11. The power transfer system of claim 1 further comprising brake means for selectively inhibiting movement of said drive mechanism, said brake means being electrically controlled between an actuated state and a de-actuated state such that said brake means is actuated in response to interruption of power to said actuator means.

12. A power transfer system for a motor vehicle having an engine and first and second sets of wheels, the power transfer system comprising:
a transfer mechanism for transmitting drive torque from the engine to the first set of wheels and selectively transmitting drive torque to the second set of wheels through a transfer clutch capable of varying the torque transmitted therethrough by varying a clutch engagement force;
a drive mechanism for generating said clutch engagement force, said drive mechanism including a lever arm supported for pivotal movement between a first position for generating a minimum clutch engagement force and a second position for generating a maximum clutch engagement force;
a linear actuator including a linearly extendable member adapted to move said lever arm between said first position and said second position;
first sensor means for sensing the rotational speed of the first set of wheels and generating a first speed signal indicative thereof;
second sensor means for sensing the rotational speed of the second set of wheels and generating a second speed signal indicative thereof; and
control means for receiving said first and second speed signals and generating a speed differential signal that is indicative of a speed differential between the first and second sets of wheels, said control means operable for controlling actuation of said linear actuator for varying the torque transmitted through said transfer clutch in response to the position of said lever arm between said first and second positions in accordance with said speed differential signal.

13. The power transfer system of claim 12 further comprising third sensor means for generating a position signal indicative of a position of a movable control element under the control of a vehicle operator, said position signal being delivered to said control means for use in conjunction with said speed differential signal for modifying the actuated condition of said transfer clutch.

14. The power transfer system of claim 12 wherein said control means generates a control signal that is proportional to said speed differential signal.

15. The power transfer system of claim 14 wherein said linear actuator is electronically-controlled and wherein said linearly extendable member acts directly on said lever arm for controlling movement between said first position and said second position in response to the magnitude of said control signal.

16. The power transfer system of claim 15 wherein said control means causes said linear actuator to maintain said lever arm in said first position when the value of said speed differential signal is less than a predetermined minimum value, and said lever arm being moved to said second position in response to a speed differential signal having a predetermined maximum value, and wherein said control means actuates said actuator for increasing the magnitude of drive torque transmitted through said transfer clutch in response to increasing values of said speed differential signal between said predetermined minimum value and said predetermined maximum value.

17. The power transfer system of claim 12 further comprising mode select means for enabling a vehicle operator to select one of a two-wheel drive mode, a part-time four-wheel drive mode, and an on-demand drive mode, and generate a mode signal indicative of the particular mode selected, said control means controlling actuation of said actuator for shifting said transfer mechanism into said selected one of said drive modes in response to said mode signal, said control means operable for actuating said actuator to move said lever arm to said first position when said two-wheel drive mode is selected, for actuating said actuator to move said lever arm to said second position when said part-time four-wheel drive mode is selected, and for varying the position of said lever arm between said first and second positions as a function of said speed differential signal for automatically varying the amount of drive torque delivered to the second set of wheels when said on-demand drive mode is selected.

18. A power transfer system for a motor vehicle having an engine and first and second sets of wheels, the power transfer system comprising:
a transfer mechanism for transmitting drive torque from the engine to the first set of wheels and selectively transmitting drive torque to the second set of wheels through a transfer clutch capable of varying the torque transmitted therethrough by varying a clutch engagement force;
a drive mechanism for generating said clutch engagement force, said drive mechanism including a lever arm supported for pivotable movement between a first position for generating a minimum clutch engagement force and a second position for generating a maximum clutch engagement force;
an electrically-controlled actuator including a linearly extendable output member operably connected to said lever arm such that translational movement of said output member causes corresponding movement of said lever arm between said first position and the second position;
first sensor means for sensing the rotational speed of the first set of wheels and generating a first speed signal indicative thereof;
second sensor means for sensing the rotational speed of the second set of wheels and generating a second signal indicative thereof; and
control means for receiving said first and second speed signals and generating a speed differential signal that is indicative of a speed differential between the first and second sets of wheels, said control means operable for controlling actuation of said actuator as a function of said speed differential signal for varying the torque transmitted through said transfer clutch in response to the position of said lever arm.

19. The power transfer system of claim 18 wherein said control means generates a control signal that is proportional to said speed differential signal and further wherein the extended position of said output member is proportional to the magnitude of said control signal.

20. The power transfer system of claim 19 further comprising mode select means for enabling a vehicle operator to select one of a two-wheel drive mode, a part-time four-wheel drive mode, and an on-demand drive mode, and generate a mode signal indicative of the particular mode selected, said control means controlling actuation of said actuator for shifting said transfer mechanism into said selected one of said drive modes in response to said mode signal, said control means operable for actuating said actuator to move said lever arm to said first position when said two-wheel drive mode is selected, for actuating said actuator to move said lever arm to said second position when said part-time four-wheel drive mode is selected, and for varying the position of said lever arm between said first and second positions as a function of said speed differential signal for automatically varying the amount of drive torque delivered to the second set of wheels when said on-demand drive mode is selected.

* * * * *